(12) United States Patent  
Pan et al.

(10) Patent No.: US 6,456,389 B1
(45) Date of Patent: Sep. 24, 2002

(54) INTEGRATED BIT ROTATION AND ROW ALIGNMENT WITHIN DIGITAL IMAGE PRINTING SYSTEMS

(75) Inventors: Danjie Pan, Costa Mesa, CA (US); Chong-Hing Cheung, Mission Viejo, CA (US)

(73) Assignee: Viewahead Technology, Inc., Redmond, WA (US)

( * ) Notice: Subject to any disclaimer, the term of this patent is extended or adjusted under 35 U.S.C. 154(b) by 0 days.

(21) Appl. No.: 09/282,956

(22) Filed: Apr. 1, 1999

(51) Int. Cl.$^7$ ............................................... G06K 15/00
(52) U.S. Cl. ....................................... 358/1.17; 358/1.1
(58) Field of Search ........................... 358/1.1, 1.2, 1.5, 358/1.8, 1.19, 1.16, 1.17; 382/293, 296, 297, 301

(56) References Cited

U.S. PATENT DOCUMENTS 5,012,434 A * 4/1991 Zietlow et al. ............ 358/1.18

* cited by examiner

*Primary Examiner*—Arthur G. Evans
(74) *Attorney, Agent, or Firm*—Stoel Rives, LLP

(57) ABSTRACT

A digital image printer that performs bit rotation and row alignment in preparation for final image reproduction. The present invention combines the two digital image data processing functions of bit rotation and row alignment into a single functional step. The two functions are performed simultaneously, in that, while row alignment is being performed during the deposition of a portion of the digital image data into a certain portion of a group of memory buffers, bit rotation is performed by extracting another portion of the digital image data from another portion of a group of memory buffers. The present invention reduces the number of required digital image data memory buffers required to perform the two functions of bit rotation and row alignment from conventional systems that perform the two functions sequentially and utilize a direct memory access channel to perform the data transfer between integrated circuitry that performs the two functions. The present invention presents a design that is inherently scaleable to accommodate any variety of digital image printing systems having various mechanical and electrical characteristics. The present invention does not require any digital image data preprocessing by a host before receiving the digital image data in preparation for digital image reproduction.

20 Claims, 8 Drawing Sheets

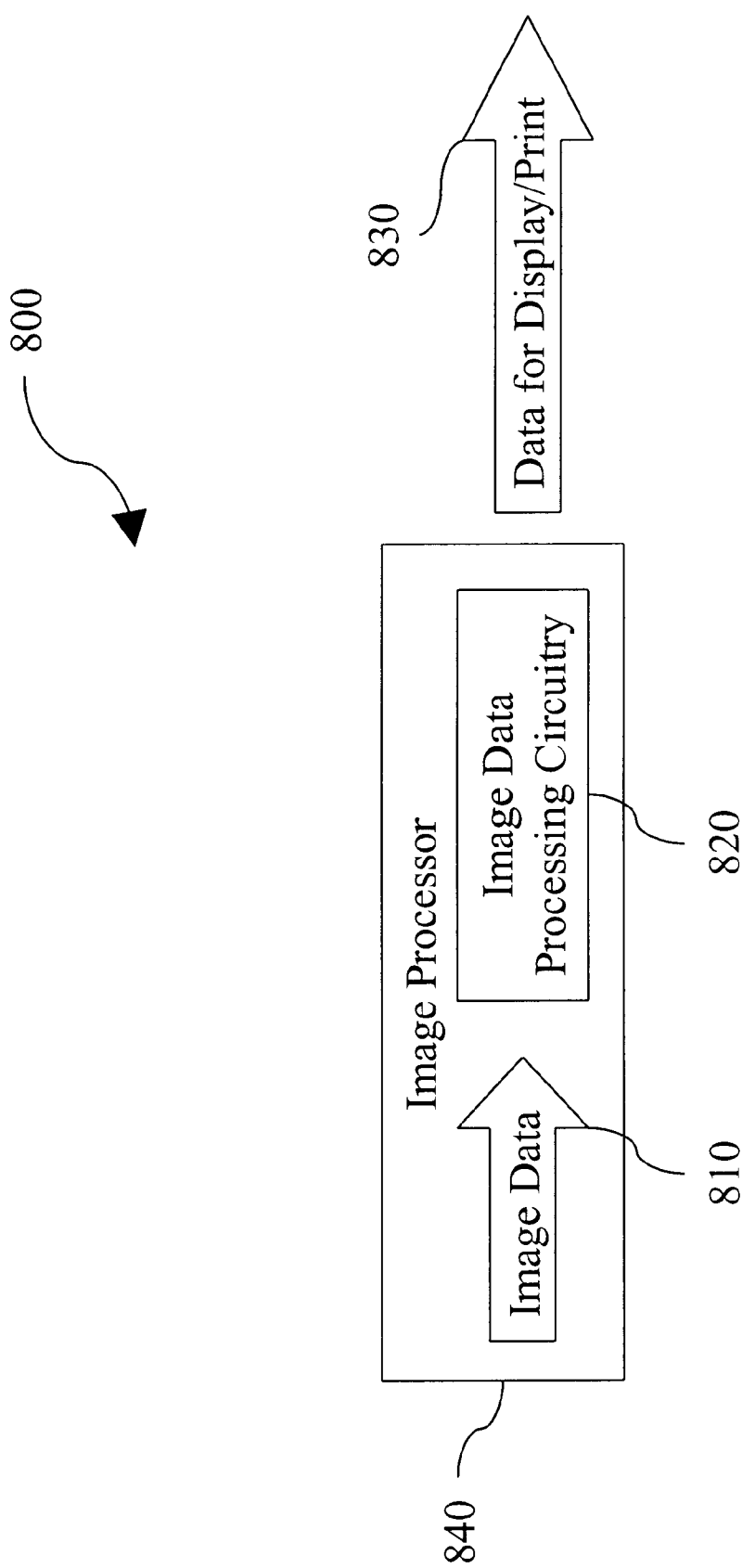

INTEGRATED BIT ROTATION AND ROW ALIGNMENT WITHIN DIGITAL IMAGE PRINTING SYSTEMS

INCORPORATION BY REFERENCE

The following applications are hereby incorporated herein by reference in their entirety and made part of the present application:

1) U.S. patent application Ser. No. 09/282,949, filed Apr. 1, 1999;

2) U.S. patent application Ser. No. 09/283,876, filed Apr. 1, 1999;

3) U.S. patent application Ser. No. 09/283,175, filed Apr. 1, 1999.

BACKGROUND

1. Technical Field

The present invention relates generally to digital image data processing; and, more particularly, it relates to digital image printing.

2. Description of Related Art

Conventional digital image printing systems, in that they commonly employ parallel image data processing to image data throughout the digital image printing system, inherently require a significant dedication of real estate within its integrated circuitry. For example, for a digital image printing system that can accommodate a wide variety of image data having varying data sizes. Conventional digital image printing systems that perform bit rotation and row alignment on a group of digital image data perform them sequentially and most commonly using parallel processing circuitry. Typically, bit rotation is performed in one digital image processing step, and row alignment is performed in another digital image data processing step.

Conventional systems will often employ multiple data buffers, one dedicated for each of the two digital image data processing steps, wherein the processing circuitry accesses only one of the data buffers at a time. The conventional process of performing the two functions of bit rotation and row alignment is executed by doing one memory access from the first data buffer, performing digital image data processing using one processing circuit to achieve row alignment, then using a direct memory access channel to transfer the row aligned digital image data to another processing circuit to perform bit rotation. This direct memory access channel, accompanied with the sequential manner of performing the two functions of bit rotation and row alignment, is inherently space consumptive within integrated circuitry of a digital image printing system. Additionally, given the large number of data buffers that are required to perform the data management to perform these two functions independently and sequentially, a large amount of valuable integrated circuitry real estate is consumed. This increases the size of integrated circuitry that performs this digital image data processing of the digital image data.

Conventional digital image printing systems perform extensive preprocessing using a host before transmitting the digital image data to the digital image printing system for printing. The preprocessing includes, among other things, data preparation in a proper format to interface with the processing circuitry having a predetermined number of data channels. This data preparation is required in large part due to the parallel processing circuitry employed within conventional digital image printing systems.

Another disadvantage is when performing image data processing in an intrinsically parallel manner, different logic circuitry is required to deal with each digital image printing system having varying physical and mechanical characteristics such as different number of ink jet nozzles. To accommodate image data processing within each of the different digital image printing systems having different physical and mechanical characteristics, additional logic circuitry is required to provide image data processing for each of the various possible digital image printing systems. This large dedication of parallel processing circuitry, for each of the possible digital image printing systems in which the image processing circuitry may be installed, greatly increases the size, and therefore the cost, of an integrated circuit used to perform these image data processing functions, as described above.

Conventional digital image printing systems commonly perform a number of functions, some of which are highly computationally intensive. The conventional manner of dedicating a fixed amount of parallel logic circuitry to perform each of the functions within the digital image printing system inherently leads to unused portions of logic circuitry on a potentially significant portion of an integrated circuit. In addition, the performance of certain functions within digital image printing system require significantly more logic circuitry, at certain times, for their respective functions than for other functions. This typically results in slowed overall image data processing within the digital image printing system.

Further limitations and disadvantages of conventional and traditional systems will become apparent to one of skill in the art through comparison of such systems with the present invention as set forth in the remainder of the present application with reference to the drawings.

SUMMARY OF THE INVENTION

Various aspects of the present invention can be found in a printer that prints digital image data. The printer contains a memory that stores the digital image data for processing in preparation to final printing. The digital image data is partitioned into a first portion of image data and a second portion of image data. Processing circuitry performs row alignment on the first portion of the image data and bit rotation on the second portion of the image data. In certain embodiments of the invention, the processing circuitry is partitioned into a first processing circuit and a second processing circuit. A direct memory access controller is used in other embodiments of the invention to store the first portion of image data into the memory and to retrieve the second portion of image data from the memory.

The printer is an ink jet printer in certain embodiments of the invention. A data register is used to store the image data prior to ink jet firing. The memory that is used to perform the image data processing on the digital image data is made up of two groups of memory buffers in one embodiment. Each memory group has at least one even memory buffer and at least odd even memory buffer. The memory is a crossing group ping pong buffer. The image data that is used in the invention is provided by any number of devices capable of providing digital image data including, among other things, by a computing device.

In certain embodiments of the invention wherein the processing circuitry is partitioned into a first processing circuit and a second processing circuit, the first processing circuit performs row alignment on a portion of the image data, and the second processing circuit performs bit rotation on the same portion of the image data.

In certain embodiments of the invention, the printer is contained within a multi-functional peripheral. The multi-functional peripheral device is a peripheral device containing a plurality of internal devices wherein each of the devices operates either independently or cooperatively to process the plurality of image data. Alternatively, the printer is contained within a stand alone device performing primarily digital image printing. The stand alone device interfaces with additional peripheral devices, including a computing device, if desired.

Other aspects, advantages and novel features of the present invention will become apparent from the following detailed description of the invention when considered in conjunction with the accompanying drawings.

BRIEF DESCRIPTION OF DRAWINGS

FIG. 8 is an image processor illustrating one specific embodiment of the present invention that performs image data processing to make a plurality of image data suitable for displaying or printing.

DETAILED DESCRIPTION OF DRAWINGS

Figure 1:
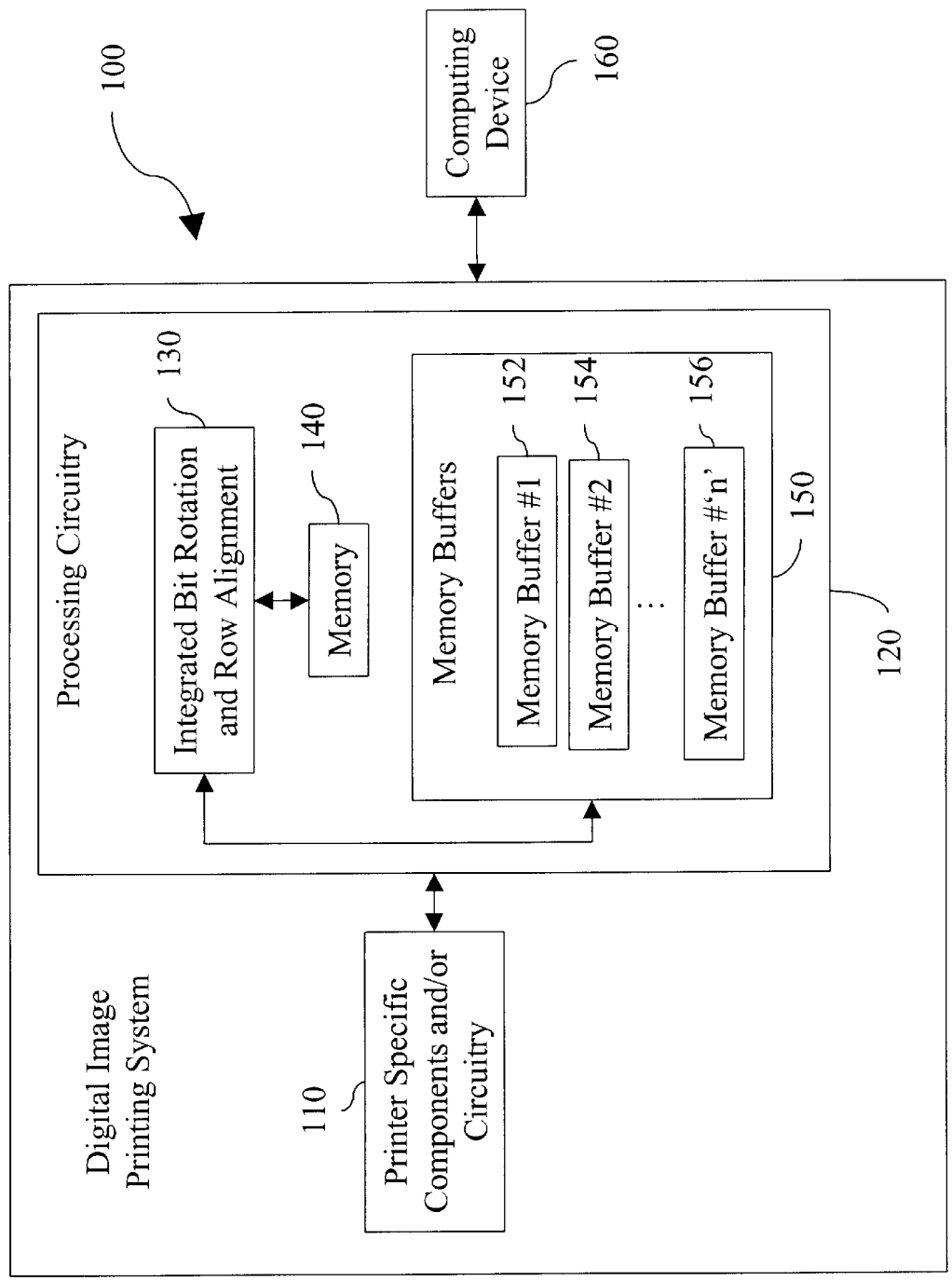
FIG. 1 is a digital image printer that performs integrated bit rotation and row alignment illustrating one embodiment of the present invention.

FIG. 1 is a digital image printer 100 that performs integrated bit rotation and row alignment 130 illustrating one embodiment of the present invention. Processing circuitry 120 is used to perform digital image processing. The processing circuitry 120 performs integrated bit rotation and row alignment 130 using a memory 140 for digital image data processing and a plurality of memory buffers 150 for performing digital image data memory management. The plurality of memory buffers 150 are shown as a memory buffer #1 152, a memory buffer #2 154, and a memory buffer #'n' 156. The entirety of the processing circuitry 120 interfaces with a digital image printer housing having printer specific components and/or circuitry 110. The digital image printer housing contains the processing circuitry 120 in one embodiment of the invention. The digital image printer 100 interfaces with a computing device 160. The interfacing between the digital image printer 100 and the computing device 160 is performed using any means known in the art for communicatively coupling, transmitting and receiving digital image data. In certain embodiments of the invention, the computing device 160 communicates with the digital image printer 100 via a communication link thereby permitting the provision of image data from a wide variety of sources.

Figure 2:
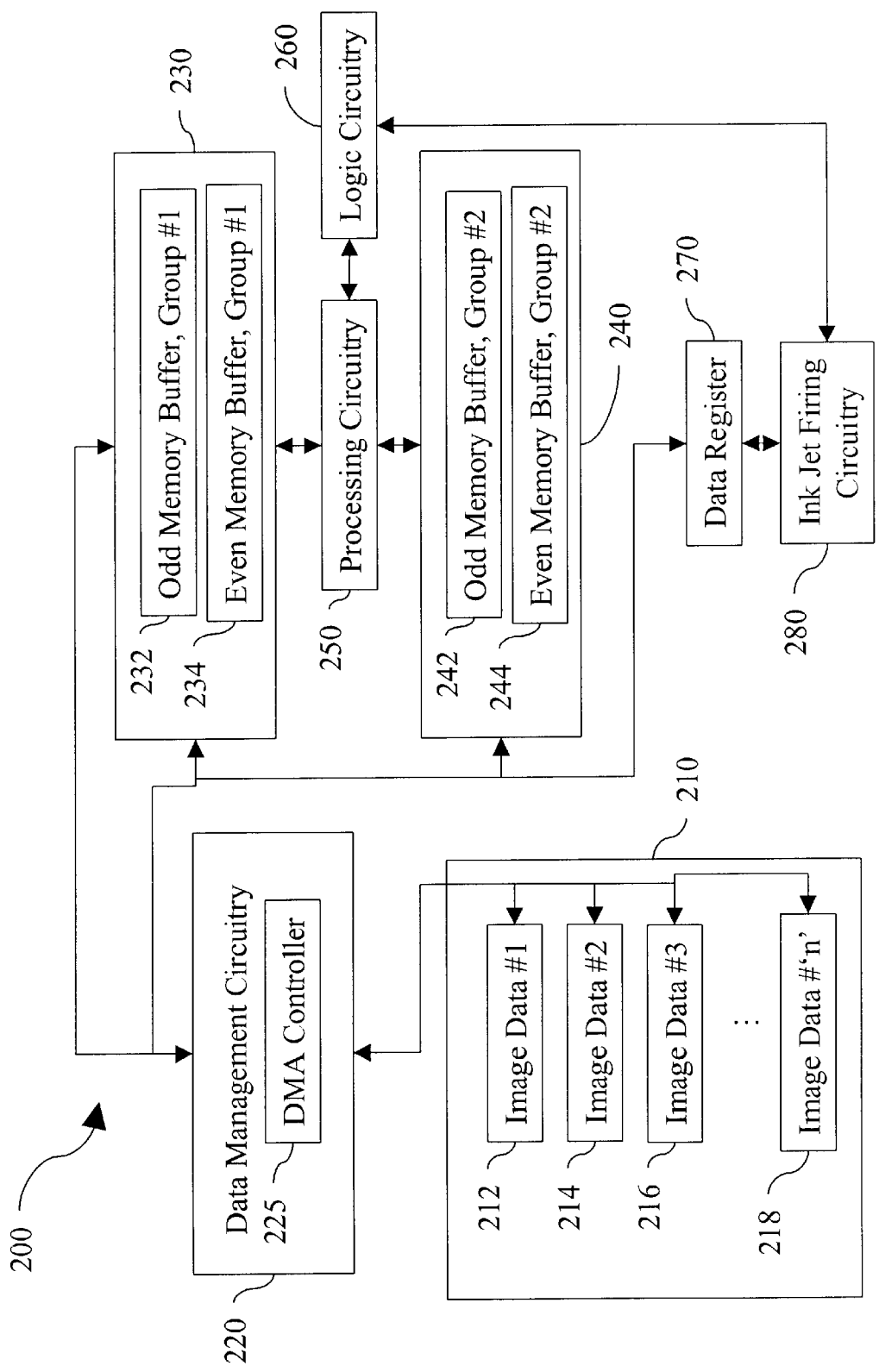
FIG. 2 is a digital image printer that performs uses a crossing ping pong buffer arrangement illustrating one specific embodiment of the digital image printer of FIG. 1.

FIG. 2 is a digital image printer 200 that performs uses a crossing ping pong buffer arrangement illustrating one specific embodiment of the digital image printer of FIG. 1. Data management circuitry 220 performs digital image data memory management on a plurality of digital image data 210. The plurality of image data 210 is shown by a digital image data #1 212, a digital image data #2 214, a digital image data #3 216, and a digital image data #'n' 218. The data management circuitry 220 contains a direct memory access (DMA) controller 225 to assist in the management of the plurality of digital image data 210 in transferring it to a first group of memory buffers 230 and a second group of memory buffers 240. The first group of memory buffers 230 is composed of an odd memory buffer, group #1 232 and an even memory buffer, group #1 234. The odd memory buffer, group #1 232 stores digital image data of an odd characteristic. The even memory buffer, group #1 234 stores digital image data of an even characteristic. The even and odd characteristics correspond to even and odd lines of data in certain embodiments of the invention. The second group of memory buffers 240 is composed of an odd memory buffer, group #2 242 and an even memory buffer, group #2 244. In certain embodiments of the invention, the plurality of digital image data 210 is first stored into the odd memory buffer, group #1 232 and the even memory buffer, group #1 234 and then stored into the odd memory buffer, group #2 242 and even memory buffer, group #2 244.

The crossing ping pong buffer transfers the plurality of digital image data 210 into the first group of memory buffers 230 and performs row alignment. The crossing ping pong buffer then retrieves the plurality of digital image data 210 from the second group of memory buffers 240 and performs bit rotation. The crossing ping pong buffer into the first group of memory buffers 230 and the second group of memory buffers 240. The parallel operation of the crossing ping pong buffer ensures that efficient use of the processing circuitry 250, thereby resulting in an effective means of performing image data processing.

Processing circuitry 250 and logic circuitry 260 operate to perform the digital image data processing on the plurality of digital image data 210. The row alignment is performed during the storing of the plurality of digital image data 210 into the odd memory buffer, group #1 232 and the even memory buffer, group #1 234, and the bit rotation is performed using the processing circuitry 250 and the logic circuitry 260 on a portion of the plurality of digital image data 210 that is retrieved from the odd memory buffer, group #2 242 and the even memory buffer, group #2 244. Once the plurality of digital image data 210 has undergone both row alignment and bit rotation, it is transferred to a data register 270. The plurality of digital image data 210 is then transferred to ink jet firing circuitry 280 for reproduction of the plurality of digital image data 210. The ink jet firing circuitry 280 performs handshaking with the logic circuitry 260 to determine the status and availability of the plurality of digital image data 210

Figure 3:
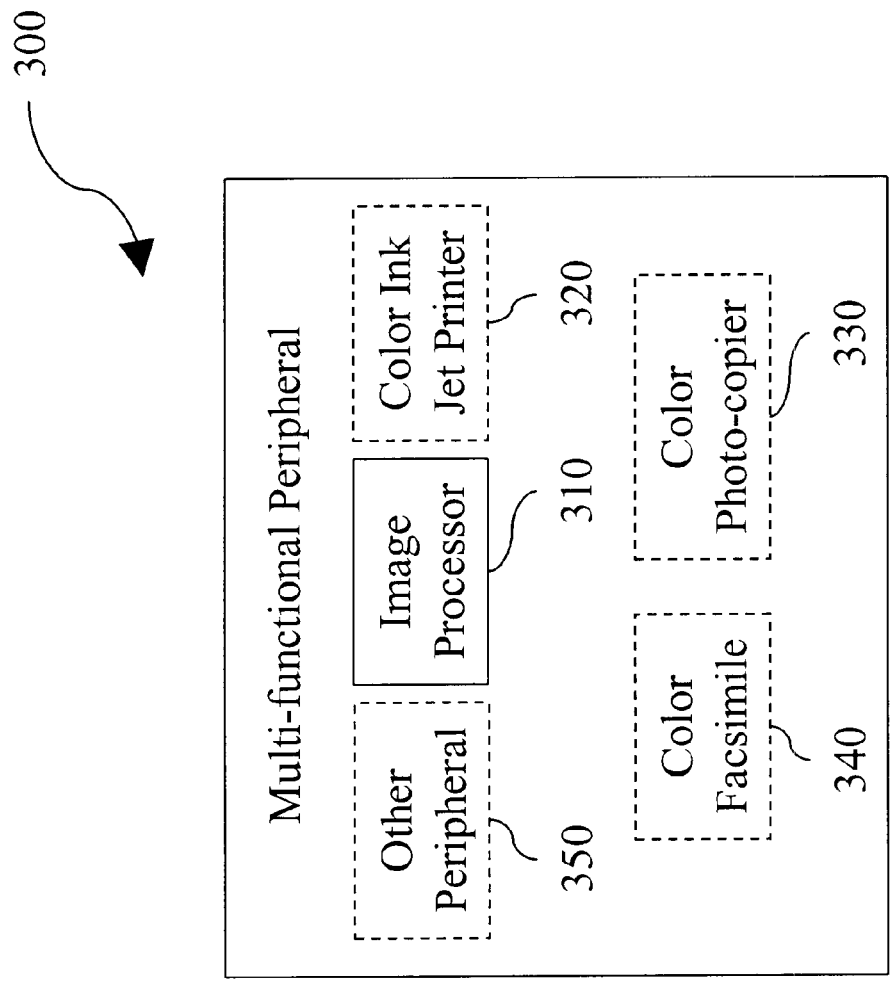
FIG. 3 is a multi-functional peripheral that contains an image processor illustrating one embodiment of the present invention.

FIG. 3 is a multi-functional peripheral 300 that contains an image processor 310 illustrating one embodiment of the present invention. In certain embodiments, additional peripheral devices are included in the multi-functional peripheral 300. The multi-functional peripheral 300 contains any number of devices that cooperatively perform processing using the image processor 310 to prepare image data in a form suitable for printing or display that is of a high visible perceptual quality. Examples of such devices include color photo-copy machines, color facsimiles, color printers, black and white printers, and digital printers.

In certain embodiments of the invention, the multi-functional peripheral 300 contains several of the devices described above. In certain embodiments of the present invention, a color ink jet printer 320 is included in the multi-functional peripheral 300. In other embodiments, a color photo-copier 330 and a color facsimile 340 are both contained in the multi-functional peripheral 300 thereby providing multiple functions all within a single device. Those having skill in the art will recognize that any other peripheral 350 could be similarly included in the multi-functional peripheral 300 without departing from the scope and spirit of the invention. In certain embodiments, the multi-functional peripheral 300 provides a system in which various devices serve one another in receiving data in one form and converting it into another for appropriate display, reproduction, or transmission. In certain embodiments, the color photo-copier 330 converts a plurality of image data 710, to a plurality of image data for display/print 1030 that is suitable for display or printing (See FIG. 7). The plurality of image data 710 is then input into the color facsimile 340 wherein it is viewed or reproduced as the plurality of image data 730. The color facsimile 340 performs converts the plurality of image data 710 to a form suitable for transmission on the communication link 290 (See FIG. 2). Those having skill in the art will recognize that the image data addressing system 100, as described in FIG. 1, is contained within the multi-functional peripheral 300 in many of the various embodiments of the invention.

Figure 4:
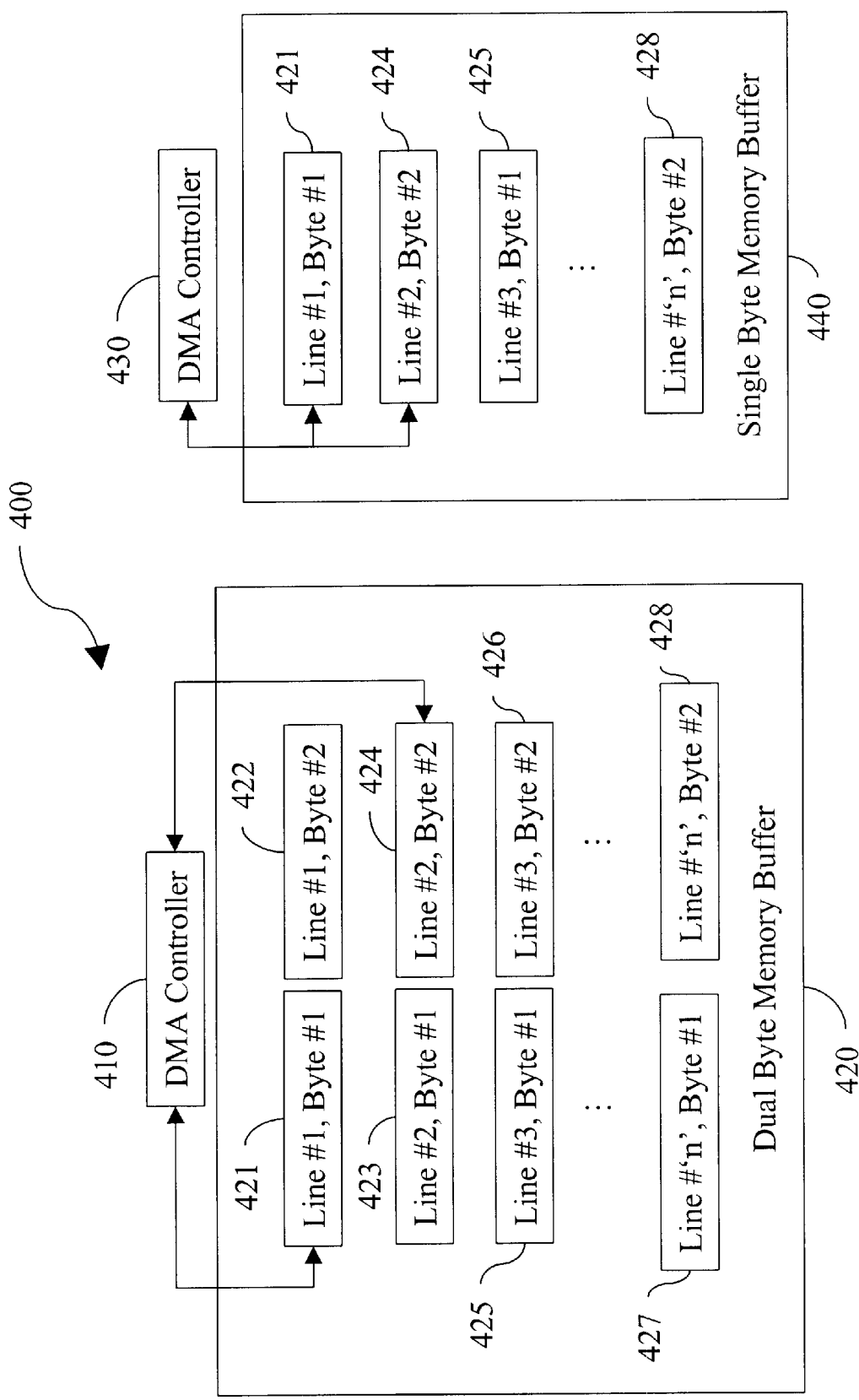
FIG. 4 is a digital image printer illustrating a specific embodiment of any one or more of FIGS. 1, 2 or 3.

FIG. 4 is a digital image printer 400 illustrating a specific embodiment of any one or more of FIGS. 1, 2 or 3. A direct memory access (DMA) controller 410 operates in conjunction with a dual byte memory buffer 420 in accordance with conventional digital image printing systems. A plurality of digital image data is stored in the dual byte memory buffer 420. A first line of digital image data having a width of two bytes is shown by a line #1, byte #1 421 and a line #1, byte #2 422. Similarly, a second line of digital image data having a width of two bytes is shown by a line #2, byte #1 423 and a line #2, byte #2 424. Similarly, a third line of digital image data having a width of two bytes is shown by a line #3, byte #1 425 and a line #3, byte #2 426. Finally, an 'n'th line of digital image data having a width of two bytes is shown by a line #'n', byte #1 427 and a line #'n', byte #2 428. If the ink jet nozzle separation of a digital image printer is larger than that which can be represented using a single byte width of data, a conventional system employing the direct memory access (DMA) controller 410 must access a first byte from one line and possibly a second byte from another line. This particular example is illustrated wherein the direct memory access (DMA) controller 410 access the line #1, byte #1 421 and the line #2, byte #2 424. The direct memory access (DMA) controller 410 could very well have accessed two bytes from a single line.

A direct memory access (DMA) controller 430 built in accordance with the present invention operates with a single byte memory buffer 420. The same plurality of digital image data is stored in the single byte memory buffer 430, but in a different format. A single byte is stored in each line of the single byte memory buffer 430. However, the direct memory access (DMA) controller 430 only stores and accesses those portions of data that are required for performing subsequent digital image data processing thereby shortening the required word width to only one byte. In following the example for the direct memory access (DMA) controller 420, the line #1, byte #1 421 is stored first, followed by the line #2, byte #2 424, and the line #3, byte #1 425. Finally the line #'n', byte #2 428 is stored in the direct memory access (DMA) controller 440. Only those portions of digital image data that are required to be accessed by the direct memory access (DMA) controller 430 are stored.

Figure 5:
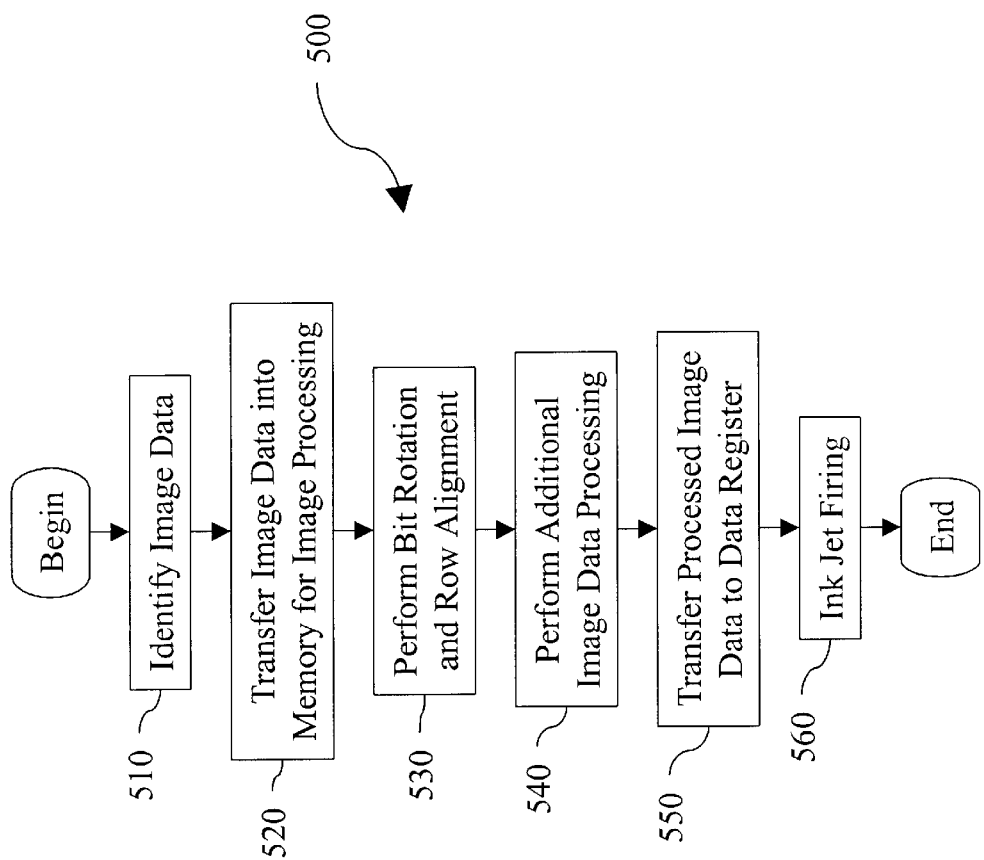
FIG. 5 is a functional block diagram illustrating another embodiment of the present invention that performs integrated bit rotation and row alignment.

FIG. 5 is a functional block diagram illustrating another embodiment of the present invention that performs integrated bit rotation and row alignment. In a block 510, a plurality of digital image data is identified for performing digital image data processing using any of the embodiments illustrated above in FIGS. 1–4. In a block 520, the digital image data is transferred into a memory for performing the image data processing. The transfer is performed using direct memory access (DMA) controller 430 of FIG. 4 in certain embodiments of the invention. Alternatively, the transfer is performed using the direct memory access (DMA) controller 225 of the data management circuitry 220 of FIG. 2 in other embodiments of the invention. In a block 530, bit rotation and row alignment is performed on the digital image data. The performance of these two functions is performed cooperatively, as described above. In a block 540, additional image data processing is performed. This additional image data processing includes any image data processing required in preparation to the ink jet printing. The additional image data processing is performed in accordance with that known to those skilled in the art. In a block 550, the digital image data is transferred to a data register prior to ink jet firing in a block 560.

Figure 6:
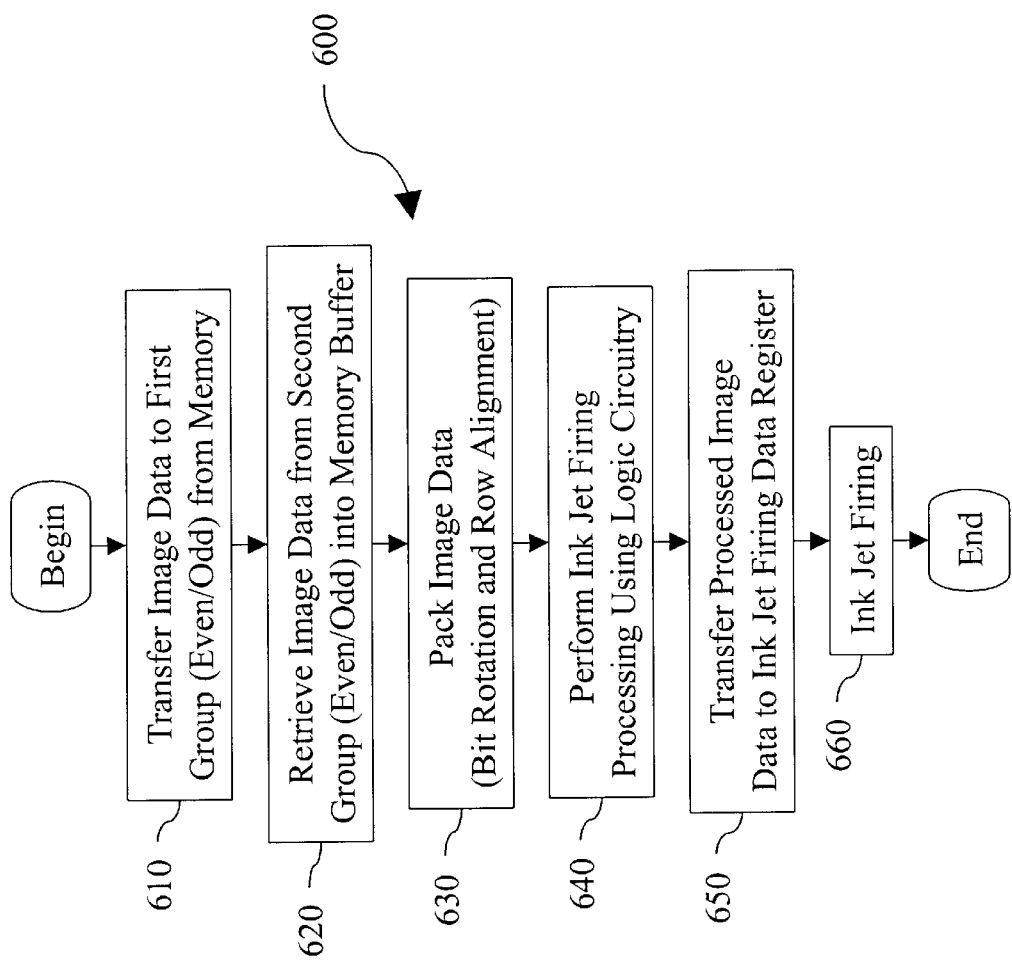
FIG. 6 is a functional block diagram illustrating a specific embodiment of the functional block diagram of FIG. 5.

FIG. 6 is a functional block diagram illustrating a specific embodiment of the functional block diagram of FIG. 5. In a block 610, another plurality of digital image data are transferred to a second group of memory buffers having both an even and an odd memory buffer. In certain embodiments of the invention, the transfer is performed using the digital image printer 200 having the first group of memory buffers 230 and the second group of memory buffers 240, as shown in FIG. 2. In a block 620, another plurality of digital image data are retrieved from a second group of memory buffers having both an even and an odd memory buffer. In a block 630, the plurality of digital image data is packed in such a way that bit rotation and row alignment are achieved. In a block 640, ink jet firing image data processing is performed. Finally, in a block 650, the digital image data is transferred to an ink jet firing data register prior to ink jet firing in a block 660.

Figure 7:
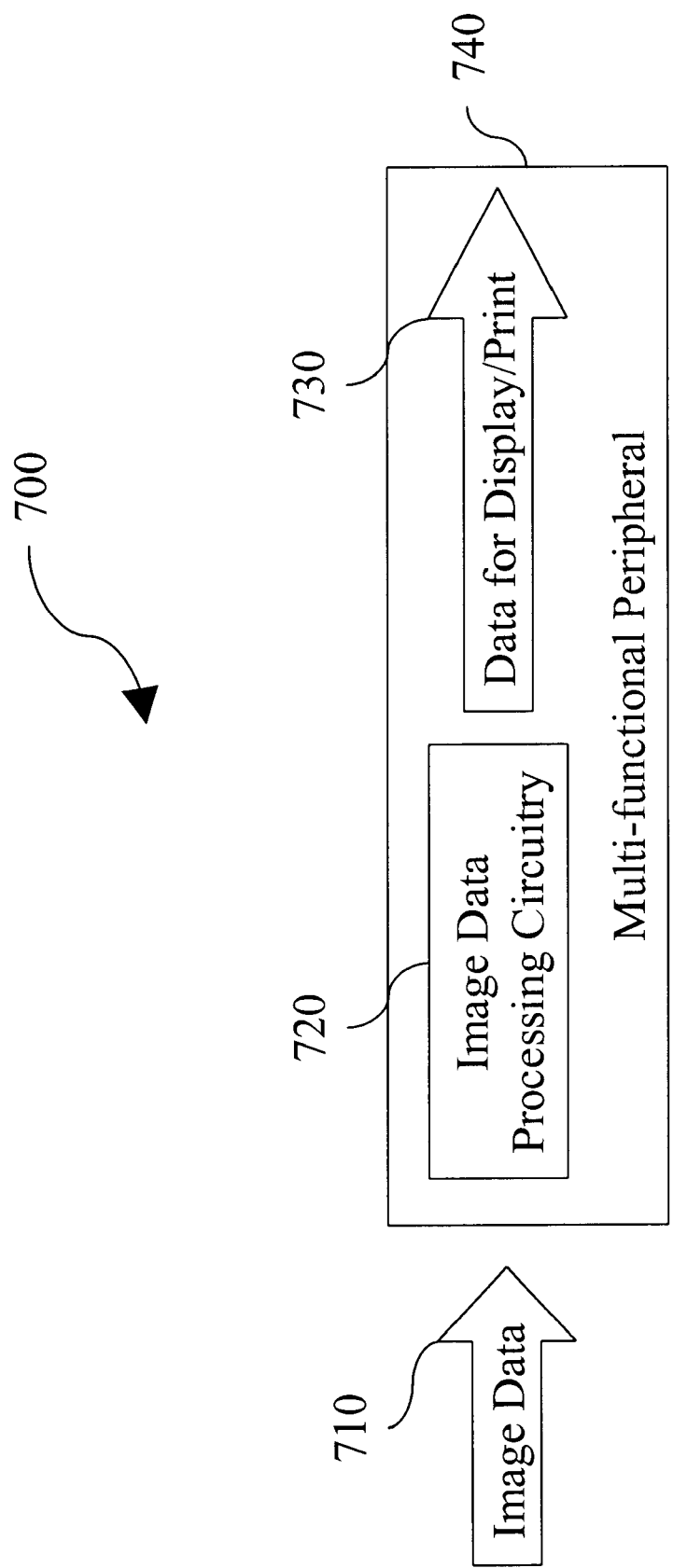
FIG. 7 is a multi-functional peripheral illustrating one specific embodiment of the present invention that performs image data processing to make a plurality of image data suitable for displaying or printing.

FIG. 7 is a multi-functional peripheral 740 illustrating one specific embodiment 700 of the present invention that performs image processing to make a plurality of image data 710 suitable for displaying or printing, i.e., into a plurality of image data for display/print 730. In certain embodiments of the invention, the multi-functional peripheral 740 is the multi-functional peripheral 300 as described in FIG. 3. The multi-functional peripheral 740 contains image data processing circuitry 720 that is used to process a plurality of image data 710. The multi-functional peripheral 740 converts the plurality of image data 710 into the plurality image data for display/print 730. The plurality image data for display/print 730 is in a form suitable for printing on color ink jet printers in certain embodiments of the invention. In other embodiments, it is in a form suitable for laser printers. In certain embodiments of the invention, the processing circuitry 720 is the image processor 310 as described in FIG. 3. In other embodiments, it is internal processing resources contained within any of the devices contained within the multi-functional peripheral 300 of FIG. 3 including the other peripheral 350.

FIG. 8 is an image processor 840 illustrating one specific embodiment 800 of the present invention that performs image processing to make a plurality of image data 810 suitable for displaying or printing, i.e., into a plurality of image data for display/print 830. The image processor 840 contains image data processing circuitry 820. In certain embodiments, the image processor 840 is substantially the same as the image processor 310 as described in the multi-functional peripheral 300 of FIG. 3. The image data processing circuitry 820 is used to process the plurality of image data 810 into the plurality of image data for display/print 830. In certain embodiments of the invention, the image processor 840 is a processing system internal to any of the devices contained within the multi-functional peripheral 300 of FIG. 3 including the other peripheral 350.

In view of the above detailed description of the present invention and associated drawings, other modifications and variations will now become apparent to those skilled in the art. It should also be apparent that such other modifications and variations may be effected without departing from the spirit and scope of the present invention.

What is claimed is:

1. A printer that prints digital image data the printer comprising:
    a ping-pong memory that stores the image data wherein the image data is partitioned into a first portion of image data and a second portion of image data;
    a first processing circuit that performs row alignment on the first portion of the image data; and
    a second processing circuit that performs bit rotation on a second portion of the image data in parallel with the row alignment.

2. The printer of claim 1, further comprising a direct memory access controller that stores the first portion of image data into the memory; and
    retrieves the second portion of image data from the memory.

3. The printer of claim 2, wherein the printer is an ink jet printer; and
    further comprising a data register that stores the image data prior to ink jet firing.

4. The printer of claim 1, wherein the memory comprises two groups of memory buffers, each memory group has at least one even memory buffer and at least odd even memory buffer.

5. The printer of claim 1, wherein the memory is a crossing group ping pong buffer.

6. The printer of claim 1, wherein the image data is provided by a computing device.

7. The printer of claim 1, wherein first processing circuit performs row alignment on the first portion of the image data;
    the second processing circuit performs bit rotation on the first portion of the image data.

8. The printer of claim 1, wherein the printer is contained within a peripheral device.

9. The printer of claim 1, wherein the printer is contained within a stand alone device.

10. A printer that prints digital image data, the printer comprising:
    a memory that stores the image data wherein the image data is partitioned into a first portion of image data and a second portion of image data, the memory is a crossing group ping pong buffer;
    a first processing circuit that performs row alignment on the first portion of the image data;
    a second processing circuit that performs bit rotation on a second portion of the image data;
    a direct memory access controller that performs image data management on the first portion of the image data and the second portion of the image data; and
    a plurality of logic circuitry in signal communication with the first processing circuit and the second processing circuit.

11. The printer of claim 10, wherein the direct memory access controller stores the first portion of image data into the memory; and
    retrieves the second portion of image data from the memory.

12. The printer of claim 10, wherein the memory comprises two groups of memory buffers, each memory group has at least one even memory buffer and at least odd even memory buffer.

13. The printer of claim 10, wherein the printer is an ink jet printer; and further comprising a data register that stores the image data prior to ink jet firing.

14. The printer of claim 10, wherein first processing circuit performs row alignment on the first portion of the image data;
    the second processing circuit performs bit rotation on the first portion of the image data.

15. The printer of claim 10, wherein the printer is contained within a peripheral device.

16. The printer of claim 10, wherein the printer is contained within a stand alone device.

17. A method to perform bit rotation and row alignment on image data in a printer, the method comprising:
    transferring a first group of image data to a ping pong memory to perform row alignment;
    retrieving a second group of image data from the ping pong memory to perform bit rotation;
    transferring the row aligned and bit rotated image data to a dam register to store the image data; and
    firing at least one ink jet to generate a reproduction of the image data.

18. method of claim 17, wherein the transferring a first group of image data to the ping pong memory and the retrieving a second group of image data from the ping pong memory is performed using a direct memory access controller.

19. The method of claim 17 wherein the method is performed using a multi-functional peripheral.

20. The method of claim 17, wherein the method is performed using a stand alone device.

* * * * *